United States Patent Office 2,814,562
Patented Nov. 26, 1957

2,814,562

METHOD FOR INCREASING THE GERMANIUM CONTENT OF OXIDIC GERMANIUM-ARSENIC-ZINC-CONTAINING MATERIAL

Yurii E. Lebedeff, Metuchen, N. J., and William H. Wetherill, Tottenville, N. Y., assignors to American Smelting and Refining Company, New York, N. Y., a corporation of New Jersey No Drawing. Application August 20, 1956, Serial No. 605,189

3 Claims. (Cl. 75—103)

This invention relates to a method of increasing the germanium content of a material comprising oxidic germanium, arsenic and zinc. More particularly, it relates to a method for increasing the germanium content of such material where the material is obtained by precipitating from solution.

Materials containing germanium, arsenic and zinc in oxidic form constitute an important source of germanium. Elemental germanium in a substantially pure state may be obtained from such material by subjecting it to a chloride distillation to recover substantially pure germanium tetrachloride which may then be decomposed in a conventional manner to obtain metallic germanium. However, the germanium content of the material to be treated affects the cost of any such procedure for recovering germanium. In general, the costs increase with decreasing amounts of germanium in the starting material and vice versa. Moreover, the difficulty and the cost of the distillation increase with the amount of zinc and especially with the amount of arsenic present in the material. For these reasons, the art is constantly in search for methods and means to increase the germanium content of the starting material and to decrease the amount of zinc and especially the amount of arsenic therein.

The principal object of the invention is to provide a procedure for increasing the concentration of the germanium values in a material comprising oxidic germanium, arsenic and zinc and at the same time to reduce the arsenic and zinc values therein so as to obtain an improved product for further treatment in the production of elemental germanium. The principal advantage of the invention is that it accomplishes these objectives. These and other objects and advantages will become apparent from the following more detailed description of the invention.

Broadly, the invention involves leaching a material containing oxidic germanium, arsenic and zinc with an ammoniacal solution having a pH value above 8, thereby effecting a bulk separation of the germanium from the arsenic and zinc by selectively leaching the arsenic and zinc from the material, whereby the germanium content of the latter is increased and its content of arsenic and zinc is decreased. Best results in practicing the invention are obtained with ammoniacal solutions having a pH in the range 9.0 to 11.5. Within this range, buffered ammoniacal solutions having a pH in the range 9.0 to 10.0 are most preferred. Ammonium salts are the preferred buffering agents and, of these agents, ammonium sulfate is the most preferred. Preferably also the buffered solution contains 30 to 250 grams per liter of ammonium sulfate or its equivalent.

The invention is based on the discovery that the pH value of the leach solution is critically important in its effect upon the bulk separation of arsenic and also zinc from germanium, and the germanium content of the resulting leached material. Thus, it has been found that with pH values below about 8 substantially no increase in the germanium content of the leached material takes place, and also that no bulk separation occurs between the arsenic or zinc on the one hand and the germanium on the other. Bulk separation of arsenic as well as zinc from the germanium, accompanied by an increase of the germanium content in the material commences at about pH 8. As the pH of the leach solution is increased, bulk separation and germanium concentration increase at a moderate rate with pH values up to about 9, and thereafter increase rapidly. In the case of an unbuffered ammoniacal leach solution, bulk separation and germanium concentration reach a maximum with leach solutions having a pH above 11. With buffered ammoniacal solutions, optimum germanium content in the leached material together with optimum bulk separation of the arsenic and zinc from the germanium takes place with a leach solution having a pH in the range 9.0 to 10.0. Bulk separation and germanium content also increase as the concentration of buffering agent is increased in the solution. Optimum bulk separation and germanium concentration have been obtained with a buffering agent in amounts of 50 to 100 grams per liter of ammonium sulfate or its equivalent; highest bulk separation and concentration of germanium are obtained with solutions containing a buffering agent in amounts equivalent to 200 grams per liter or more of ammonium sulfate.

Bulk separation of germanium values from fluorine values when the latter is present in the material is also effected in practicing the invention. The presence of fluorine values may be due either or both to contamination during prior processing or to the presence of fluorine values in the original material to be treated. Bulk separation of the fluorine values from the germanium values is another important advantage of the invention, especially where the product from the process is to be treated subsequently in apparatus which is corroded by fluorine or fluorine values. Thus, bulk separation of the fluorine values is particularly important when the product from the process is to be purified by the prior art practice of distillation with hydrochloric acid and chlorine in glass apparatus.

The invention may be practiced in connection with any wet or dry germanium-bearing material containing germanium, arsenic and zinc which are oxidic in form. Thus, the solid material to be treated may be a mixture of oxides, sulfates or other oxygen-containing compounds such as arsenates, arsenites, etc. For best results the material is a hydrous precipitate obtained by precipitating dissolved germanium and zinc values from an acid solution under controlled pH conditions. The precipitate may be obtained by partially neutralizing the acid solution with a suitable alkaline material, such as ammonia or an alkali metal carbonate, to a pH in the range of about 4 to 6. Preferably, however, the hydrous precipitate is one which is obtained by adding ammonia to a mineral acid solution, such as a sulfuric acid solution, containing such values until the solution has been raised to a pH above 8 and preferably in the range 9 to 10.

For best results in practicing the invention, the pH values disclosed herein are the final pH values of the ammoniacal leach solutions; that is to say, the leach solution which is in contact with the leached material at the end of the leaching step possesses a pH above 8, preferably in the range 9 to 11.5 and in the case of buffered solutions in the range 9 to 10. In general, it has been found that the pH of the leach solution remains substantially unchanged while in contact with the material during the leaching step, especially where the material to be leached is the preferred hydrous precipitate obtained by adding ammonia to an acid solution until the pH of the latter is increased to a value above 8. However, where the material to be treated contains acidic values which will consume ammonia, additional solution may be used or additional ammonia may be added initially or during the leaching step to obtain the final pH values set forth herein.

The germanium-bearing material may be contacted with the leach solution in any suitable manner. Thus, the material may merely be added to the solution or vice versa and the mixture allowed to stand for a suitable time, after which the material may be separated from the solution. Preferably, however, the material is slurried, i. e. agitated, with the solution. In general, leach solution in amounts by weight of 3 to 15, and preferably 5 to 10, times the weight of the material to be treated (on its dry basis), is used in the process although greater or lesser amounts may be used if desired. The leach solution may be kept in contact with the material for any desired time although generally a sufficient contact time is used to permit substantial equilibrium between the material and the solution to be leached. Preferably, the material is slurried with the solution for a period of about 1 to 2 hours. The leaching may be conducted at any temperature although in general room temperatures, i. e. about 30° C. are preferred.

The invention is further illustrated in the accompanying examples. It should be understood, however, that the examples are given for purposes of illustration and that the invention in its broader aspects is not limited thereto.

In Examples 3 through 7 given in Table I, a wet material containing 77.5% moisture was treated. On a dry basis, the material contained 5% germanium values calculated as Ge, 7.7% arsenic values calculated as As, and 40.9% zinc values calculated as Zn. The wet material was obtained by precipitation from a sulfuric acid solution containing dissolved germanium, arsenic and zinc values by adding ammonia to the acid solution until the pH of the solution was raised to 9.4, filtering the precipitate from the solution, and thoroughly washing the filter cake with water.

In Examples 1 and 2, the wet precipitated starting material was not washed. The wet starting material contained, on a dry basis, 3.7% Ge, 9% As, 37.4% Zn. Example 1 as used contained 70% moisture and Example 3 contained 61% moisture.

In each example in the table, the indicated amount of wet precipitate was slurried with the indicated leach solution for 1½ to 2 hours at room temperature (25–30° C.). Then the slurry was filtered and the filter cake washed. The pH of the solution at the end of the slurry period was determined and the leached residue was analyzed. The results obtained are set forth in Table I.

*Table 1*

| Example | Grs. wet wt. charge | Leach solution | | | Leached residue | | | Percent removal during leach | | | pH final solution |
|---|---|---|---|---|---|---|---|---|---|---|---|
| | | Vol. cc. | g./l. NH$_3$ | g./l. (NH$_4$)$_2$SO$_4$ | Grs. wet wt. | Grs. dry wt. | Dry basis, percent Ge | As | Zn | Ge | |
| 1 | 166 | 500 | -------- | 147 | 229 | 63.5 | 2.8 | Trace | Trace | 0.7 | 7.1 |
| 2 | 750 | 2,200 | [1] 50 | -------- | 1,050 | 230 | 4.4 | 14.0 | 16.0 | 3.0 | 8.5 |
| 3 | 200 | 640 | 50 | None | 125 | 26 | 9.2 | 46.0 | 48.0 | 0.7 | 10.6 |
| 4 | 200 | 665 | 100 | None | 70.5 | 15 | 15.0 | 83.0 | 70.5 | 3.5 | 11.4 |
| 5 | 125 | 495 | 50 | 50 | 58.0 | 14.5 | 12.7 | 70.0 | 72.0 | 3.0 | 9.8 |
| 6 | 200 | 720 | 50 | 100 | 77.0 | 15.5 | 17.5 | 86.0 | 86.0 | 10.0 | 9.8 |
| 7 | 200 | 760 | 50 | 200 | 36.0 | 7.5 | 24.8 | 93.5 | 96.0 | 19.0 | 9.6 |

[1] Total ammoniacal values calculated as NH$_3$.

This application is a continuation-in-part of our co-pending application, Serial No. 577,212, filed April 10, 1956, entitled "Separation of Arsenic from Germanium," which co-pending application is incorporated herein by reference.

What is claimed is:

1. In a method of increasing the germanium content of a material comprising oxidic germanium, arsenic and zinc the improvement which comprises leaching said material with an ammoniacal solution having a pH value above 8, thereby selectively leaching arsenic and zinc from the material whereby the germanium content of the material is increased and its arsenic and zinc content is decreased.

2. A method according to claim 1 in which said material is slurried with a buffered ammoniacial solution having a pH value in the range 9 to 10.

3. A method according to claim 2 in which said solution is buffered with a buffering agent in amounts equivalent to 30 to 250 grams per liter of ammonium sulfate.

No references cited.